(12) United States Patent  
Vahabzadeh et al.

(10) Patent No.: US 7,009,346 B2
(45) Date of Patent: Mar. 7, 2006

(54) DRIVING AN EL PANEL WITHOUT DC BIAS

(75) Inventors: Mahyar Vahabzadeh, Scottsdale, AZ (US); Robert A. Kimball, Gilbert, AZ (US); William A. Coghlan, Tempe, AZ (US)

(73) Assignee: World Properties, Inc., Lincolnwood, IL (US)

( * ) Notice: Subject to any disclaimer, the term of this patent is extended or adjusted under 35 U.S.C. 154(b) by 37 days.

(21) Appl. No.: 10/849,395

(22) Filed: May 19, 2004

(65) Prior Publication Data

US 2005/0258773 A1     Nov. 24, 2005

(51) Int. Cl.
*G09G 3/10*    (2006.01)
(52) U.S. Cl. ............... 315/169.3; 315/245; 315/169.1; 315/209 R; 315/226; 315/227 R
(58) Field of Classification Search ................ 315/167, 315/169.3, 209 R, 240, 231, 245, 246, DIG. 7, 315/169.1, 226, 227 R
See application file for complete search history.

(56) References Cited

U.S. PATENT DOCUMENTS

| | | | |
|---|---|---|---|
| 5,347,198 A | 9/1994 | Kimball | 315/167 |
| 5,502,357 A * | 3/1996 | Kimball | 315/209 R |
| 5,815,352 A * | 9/1998 | Mackenzie | 361/42 |
| 6,259,619 B1 * | 7/2001 | Buell | 363/147 |
| 6,407,507 B1 * | 6/2002 | Kimball | 315/169.3 |

* cited by examiner

*Primary Examiner*—Haissa Philogene
(74) *Attorney, Agent, or Firm*—Paul F. Wille

(57) ABSTRACT

An inverter is coupled to an EL lamp by a high pass filter including a series capacitor and a shunt resistor. The resistor is coupled in parallel with the EL lamp. The high pass filter has a time constant greater than 0.005 seconds and the capacitor has a capacitance at least ten times the capacitance of the EL lamp.

4 Claims, 1 Drawing Sheet

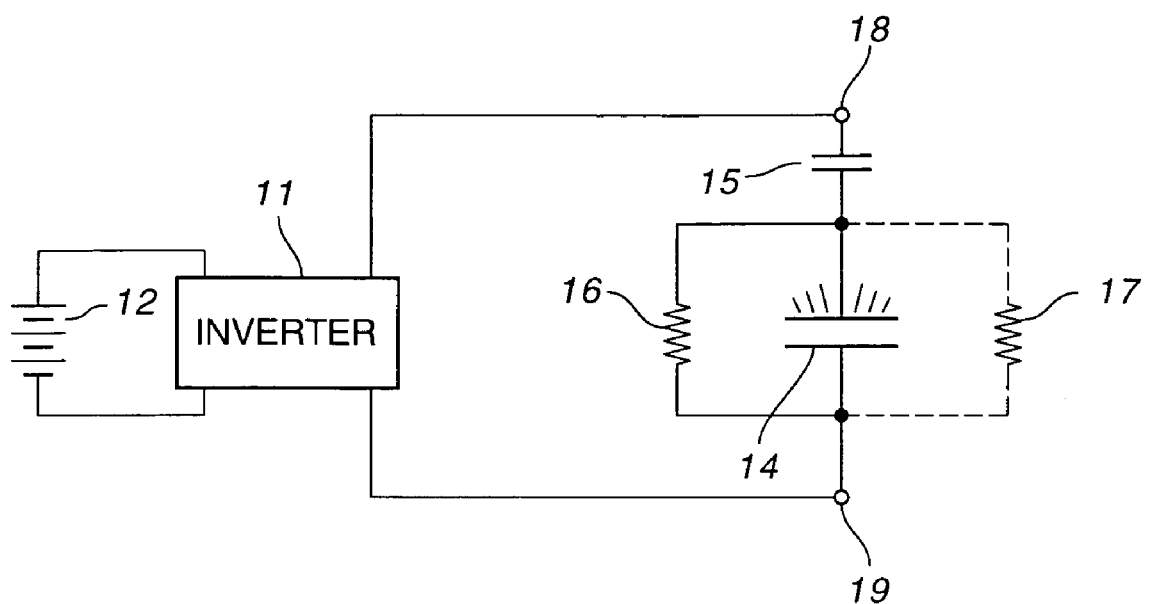
F I G. 1

DRIVING AN EL PANEL WITHOUT DC BIAS

BACKGROUND OF THE INVENTION

This invention relates to battery operated inverters and, in particular, to an inverter for driving an EL panel without producing a DC bias on the lamps in the panel.

As used herein, and as understood by those of skill in the art, "thick film" refers to one type of EL lamp and "thin film" refers to another type of EL lamp. The terms only broadly relate to actual thickness and actually identify distinct disciplines. In general, thin film EL lamps are made by vacuum deposition of the various layers, usually on a glass substrate or on a preceding layer. Thick film EL lamps are generally made by depositing layers of inks on a substrate, e.g. by roll coating, spraying, or various printing techniques. The techniques for depositing ink are not exclusive, although the several lamp layers are typically deposited in the same manner, e.g. by screen printing. A thin, thick film EL lamp is not a contradiction in terms and such a lamp is considerably thicker than a thin film EL lamp.

As used herein, an EL "panel" is a single sheet including one or more luminous areas, wherein each luminous area is an EL "lamp." An EL lamp is essentially a capacitor having a dielectric layer between two conductive electrodes, one of which is transparent. The dielectric layer can include phosphor particles or there can be a separate layer of phosphor particles adjacent the dielectric layer. The phosphor particles radiate light in the presence of a strong electric field, using relatively little current.

In the context of a thick film EL lamp, and as understood by those of skill in the art, "inorganic" refers to a crystalline, luminescent material that does not contain silicon or gallium as the host crystal. (A crystal may be doped accidentally, with impurities, or deliberately. "Host" refers to the crystal itself, not a dopant.) The term "inorganic" does not relate to the other materials from which an EL lamp is made.

EL phosphor particles are typically zinc sulfide-based materials, including one or more compounds such as copper sulfide ($Cu_2S$), zinc selenide (ZnSe), and cadmium sulfide (CdS) in solid solution within the zinc sulfide crystal structure or as second phases or domains within the particle structure. EL phosphors typically contain moderate amounts of other materials such as dopants, e.g., bromine, chlorine, manganese, silver, etc., as activators, or to modify defects in the particle lattice to modify properties of the phosphor as desired. The color of the emitted light is determined by the doping levels. Although understood in principle, the luminance of an EL phosphor particle is not understood in detail. The luminance of the phosphor degrades with time and usage, more so if the phosphor is exposed to moisture or high frequency (greater than 1,000 hertz) alternating current.

A modern (post-1985) EL lamp typically includes transparent substrate of polyester or polycarbonate material having a thickness of about seven mils (0.178 mm.). A transparent, front electrode of indium tin oxide or indium oxide is vacuum deposited onto the substrate to a thickness of 1000Å or so. A phosphor layer is screen printed over the front electrode and a dielectric layer is screen printed over phosphor layer. A rear electrode is screen printed over the dielectric layer. It is also known in the art to deposit the layers by roll coating.

The inks used include a binder, a solvent, and a filler, wherein the filler determines the nature of the ink. A typical solvent is dimethylacetamide (DMAC). The binder is typically a fluoropolymer such as polyvinylidene fluoride/hexafluoropropylene (PVDF/HFP), polyester, vinyl, epoxy, or Kynar 9301, a proprietary terpolymer sold by Atofina. A phosphor layer is typically screen printed from a slurry containing a solvent, a binder, and zinc sulphide particles. A dielectric layer is typically screen printed from a slurry containing a solvent, a binder, and particles of titania ($TiO_2$) or barium titanate ($BaTiO_3$). A rear (opaque) electrode is typically screen printed from a slurry containing a solvent, a binder, and conductive particles such as silver or carbon. As long known in the art, having the solvent and binder for each layer be chemically the same or chemically similar provides chemical compatibility and good adhesion between adjacent layers; e.g., see U.S. Pat. No. 4,816,717 (Harper et al.).

In portable electronic devices, automotive displays, and other applications where the power source is a low voltage battery, an EL lamp is powered by an inverter that converts direct current into alternating current. In order for an EL lamp to glow sufficiently, a peak-to-peak voltage in excess of about one hundred and twenty volts is necessary. The actual voltage depends on the construction of the lamp and, in particular, the field strength within the phosphor powder. The frequency of the alternating current through an EL lamp affects the life of the lamp, with frequencies between 200 hertz and 1000 hertz being preferred. Ionic migration occurs in the phosphor at frequencies below 200 hertz. Above 1000 hertz, the life of the phosphor is inversely proportional to frequency.

A suitable voltage can be obtained from an inverter using a transformer. For a small panel, a transformer is relatively expensive. The prior art discloses several types of inverters in which the energy stored in an inductor is supplied to an EL lamp as a small current at high voltage as the inductor is discharged either through the lamp or into a storage capacitor. The voltage on a storage capacitor is pumped up by a series of high frequency pulses from the inverter. Capacitive pump circuits are also known but not widely used commercially.

The direct current produced by inverter must be converted into an alternating current in order to power an EL lamp. U.S. Pat. No. 4,527,096 (Kindlmann) discloses a switching bridge for this purpose. The bridge acts as a double pole double throw switch to alternate current through the EL lamp at low frequency. U.S. Pat. No. 5,313,141 (Kimball) discloses an inverter that produces AC voltage directly. A plurality of inverters are commercially available using either technology.

In general, inverters produce voltages that are only approximations of sinusoidal alternating current. In particular, the positive and negative half cycles of current are not necessarily identical. The result is a DC bias on an EL lamp that causes ionic migration from the phosphor layer and silver migration from the rear electrode, if silver particles were used. It is known in the art to use a DC blocking capacitor in series with an EL lamp; e.g. see U.S. Pat. No. 5,347,198 (Kimball). It is known in the art to use barrier layers to prevent or to impede silver migration; e.g. see U.S. Pat. No. 6,445,128 (Bush et al.).

As noted in the Kimball patent, a capacitor has a much higher leakage resistance than an EL lamp. Thus, the DC voltage drop across an EL lamp connected in series with a capacitor is minimal. As also noted in the Kimball patent, there is a miniscule current flowing through an EL lamp even in the "off" state, i.e. when a driver is turned off without fully discharging the lamp. The miniscule current, corresponding to a very small DC bias, has been found to cause ionic migration.

It is also known in the art to control the discharge of an EL lamp to simulate alternating current (e.g. U.S. Pat. No. 5,886,475; Horiuchi et al.), to reduce acoustic noise emitted by an EL lamp (e.g. U.S. Pat. No. 6,555,967; Lynch et al.), or to recover energy from an EL lamp (e.g. U.S. Pat. No. 5,982,105; Masters). While controlled discharge is known, such is not the same as discharging to zero volts. For example, circuits that are concerned with acoustic noise from an EL lamp only reduce the voltage across the lamp to a certain level, below which an abrupt change in voltage causes inaudible noise, if any noise at all. The abrupt change is not necessarily to zero volts and can leave a residue of as much as ten or twelve volts.

Other types of circuits have the same problem. Any circuit that uses pumping (whether capacitive or inductive) faces diminishing returns, i.e., less charge per pump cycle as an EL lamp discharges. The result is that pumping stops before zero volts is reached and the lamp is not fully discharged. Circuits that appear to be balanced or symmetrical, such as an "H-bridge" output, are not. Processing variations cause transistors to switch at slightly different voltages. Carefully matched or compensated switching elements are too expensive in the market for DC inverters for EL lamps. The result is DC bias on an EL lamp. Even a small DC bias is harmful, causing shortened life compared to properly driven lamps.

In view of the foregoing, it is therefore an object of the invention to provide a power supply for driving an EL panel from a battery without producing a DC bias on the panel.

SUMMARY OF THE INVENTION

The foregoing objects are achieved in this invention in which an inverter is coupled to an EL lamp by a high pass filter including a series capacitor and a shunt resistor. The resistor is coupled in parallel with the EL lamp and has a lower resistance than the lamp, thereby shunting the miniscule current around the lamp. The high pass filter has a time constant greater than 0.005 seconds and the capacitor has a capacitance at least ten times the capacitance of the EL lamp.

BRIEF DESCRIPTION OF THE DRAWING

A more complete understanding of the invention can be obtained by considering the following detailed description in conjunction with the accompanying drawing, in which:

The FIGURE is a partial block diagram, partial schematic illustrating a power supply constructed in accordance with a preferred embodiment of the invention.

DETAILED DESCRIPTION OF THE INVENTION

In the FIGURE, inverter 11 is powered by a low voltage direct current, for example from battery 12, and converts the low voltage direct current into high voltage alternating current. In accordance with the invention, inverter 11 is coupled to EL panel 14 by a high pass filter including capacitor 15 and resistor 16.

Inverter 11 is any suitable inverter for supplying sufficient voltage and current to drive EL panel 14 to its rated luminosity. Inverter 11 can be transformer based or a pump type of circuit. The output from inverter 11 can be single ended (voltage and circuit ground) or floating (e.g. an H-bridge).

The high pass filter includes series capacitor 15 and shunt resistor 16. Capacitor 15 blocks direct current from passing through EL panel 14 but cannot correct for circuit imbalances within inverter 11. Resistor 16 is coupled in parallel with EL panel 14 and discharges any residual DC bias from the panel.

An EL panel is a "lossy" or "leaky" capacitor. That is, there is a finite intrinsic resistance, represented by resistor 17, bridging the plates of the capacitor. This resistance is quite large, several tens of megohms, and cannot be relied upon to discharge a panel. Stated another way, it has been found that the time constant of a panel is too long and damage occurs from DC bias before a panel can completely discharge by itself. Resistor 16 has a resistance on the order of one megohm and discharges EL panel 14 quickly but not so quickly as to interfere with the operation of inverter 11. Resistor 16 is coupled to EL panel 14 substantially continuously, unlike discharge circuits of the prior art that are intermittent.

Capacitor 15 is in series with the capacitance of EL panel 14, forming a voltage divider. As such, capacitor 15 necessarily reduces the voltage on EL panel 14. The reduction is minimized by requiring that the capacitance of capacitor 15 be at least ten times, preferably twenty times, the capacitance of EL panel 14. The larger voltage drop is across the smaller capacitor. A ratio of 10:1 or 20:1 may seem like a lot but is not. The capacitance of an EL panel is affected by the dielectric constant of the dielectric material, the thickness of the dielectric layer, and so on but is typically 3 nf per square inch. Thus, even for a panel of thirty square inches, capacitor 15 need only have a value of approximately 0.9 $\mu$f to 1.8 $\mu$f.

Together, capacitor 15 and resistor 16 have a time constant that is low compared with the frequency of the pulses applied to EL panel 14. Using the values given above, the high pass filter has a time constant of about one second, corresponding to a frequency of about one hertz, which is far lower than the frequency of the pulses typically applied to an EL panel, 200–1000 Hz. A time constant greater than 0.005 seconds is sufficient. Thus, a high pass filter constructed in accordance with the invention only very slightly reduces the voltage applied to an EL panel, compared to omitting the filter. One the other hand, one eliminates DC bias completely, thereby improving lamp brightness and lamp life.

Having thus described the invention, it will be apparent to those of skill in the art that various modifications can be made within the scope of the invention. For example, it does not matter whether capacitor 15 is above or below EL panel 14 as shown in the circuit of the FIGURE. Although illustrated as external to inverter 11, which typically is a single integrated circuit device, resistor 16 could be incorporated into an integrated circuit. An ohmic resistance is preferred to an impedance. A semiconductive device has a cut-off voltage and, absent special biasing circuitry, is unsuited to discharging EL panel 14 to zero volts. In an EL panel with a plurality of lamps, each lamp (or group of lamps operated together) has its own shunt resistor. A single series capacitor is sufficient but several could be used if desired. Using several smaller capacitors may be preferable in some circumstances to using a single larger capacitor.

The invention claimed is:

1. In a power supply for driving an EL panel from an inverter, said panel including at least one EL lamp, the improvement comprising:
   a high pass filter coupling said inverter to said EL lamp to eliminate DC bias on the EL lamp;
   wherein said high pass filter includes a series capacitor and a shunt resistor.

2. The power supply as set forth in claim 1 wherein said capacitor has a capacitance at least ten times the capacitance of said EL lamp.

3. The power supply as set forth in claim 1 wherein said resistor is coupled in parallel with said EL lamp.

4. The power supply as set forth in claim 1 wherein said high pass filter has a time constant greater than 0.005 seconds.

* * * * *